United States Patent
Häsler

(10) Patent No.: US 6,848,855 B2
(45) Date of Patent: Feb. 1, 2005

(54) FITTING

(75) Inventor: Georg Häsler, Nagold (DE)

(73) Assignee: Häfele GmbH & Co., Nagold (DE)

( * ) Notice: Subject to any disclaimer, the term of this patent is extended or adjusted under 35 U.S.C. 154(b) by 3 days.

(21) Appl. No.: 10/318,353

(22) Filed: Dec. 12, 2002

(65) Prior Publication Data

US 2003/0129021 A1 Jul. 10, 2003

(30) Foreign Application Priority Data

Dec. 14, 2001 (DE) .................................... 201 20 256 U

(51) Int. Cl.$^7$ .............................................. F16B 12/20
(52) U.S. Cl. ............................ 403/409.1; 403/DIG. 12
(58) Field of Search ....................... 403/DIG. 12, 409.1

(56) References Cited

U.S. PATENT DOCUMENTS

| | | | | |
|---|---|---|---|---|
| 4,599,011 A | * | 7/1986 | Tashiro et al. ... | 403/DIG. 12 X |
| 4,810,127 A | * | 3/1989 | Hettich ............ | 403/DIG. 12 X |
| 5,284,401 A | * | 2/1994 | Harley ............ | 403/DIG. 12 X |
| 6,276,868 B1 | * | 8/2001 | Vallance | |

FOREIGN PATENT DOCUMENTS

| | | |
|---|---|---|
| DE | 4229115 | 3/1993 |
| DE | 198 56 559 A1 | 6/2000 |
| EP | 0898089 | 2/1999 |
| FR | 2307942 | 11/1976 |

* cited by examiner

Primary Examiner—John R. Cottingham
Assistant Examiner—Ryan M. Flandro
(74) Attorney, Agent, or Firm—Friedrich Kueffner

(57) ABSTRACT

A fitting for releasably connecting two plates, particularly furniture plates, includes a clamping part rotatable between a released position and a locked position and a tightening bolt having a head received by the clamping part. The clamping part has gripping arms configured to engage behind the head of the tightening bolt when the clamping part is in the locked position. At least the surfaces of the gripping arms acting in the locked position of the clamping part against the head of the tightening bolt have a deformable intermediate layer.

5 Claims, 3 Drawing Sheets

FITTING

BACKGROUND OF THE INVENTION

1. Field of the Invention

The present invention relates to a fitting for releasably connecting two plates, particularly furniture plates. The fitting includes a clamping part which is rotatable from a released position into a locked position, wherein the clamping part receives the head of a corresponding tightening bolt. The clamping part has gripping arms which engage behind the head of the tightening bolt in the locked position of the clamping part.

2. Description of the Related Art

Fittings of the above-described type are constructed in such a way that, when the clamping part is rotated from the released position into the locked position, the tightening bolt is pulled toward the clamping part. This has the effect that two plates, in which the tightening bolt and the clamping part, respectively, are mounted, are moved toward each other and come into contact with one another. Since the plates are supposed to rest tightly against each other, the clamping part must be capable in the locked position thereof of withstanding a certain tensional load. If, for reasons of cost, inexpensive and, thus, frequently inferior material is used for the clamping part, or if the clamping part is manufactured with an insufficient amount of material, the tensional strength of the clamping part is reduced. When the tensional load is high, the clamping part may be destroyed. This is particularly the case if, due to manufacturing inaccuracies, the tightening bolt is inserted too far into the respective furniture part.

SUMMARY OF THE INVENTION

Therefore, it is the primary object of the present invention to further develop the fitting described above in such a way that undue tensional loads and/or compressive loads are avoided in the fitting when the fitting components are clamped together.

In accordance with the present invention, at least the surfaces of the gripping arms acting on the head of the tightening bolt when the clamping part is in the locked position have a deformable intermediate layer.

As a result of the configuration according to the present invention, the force exerted by the head of the tightening bolt initially is converted into a deformation of the intermediate layer before the force acts directly on the clamping part. This reduces the load acting on the clamping part and protects the clamping part against excessive tensional forces; in addition, destruction of the clamping part during assembly is prevented because the tightening bolt cannot press with excessive force against the gripping arms of the clamping part before the fitting parts are clamped together.

During assembly, the head of the tightening bolt is inserted into the clamping part in the released position thereof. Subsequently, the clamping part is rotated eccentrically into the locked position, wherein the tightening bolt which is mounted in a first plate is pulled by the clamping part which is mounted in a second plate. If the tightening bolt does not protrude by a sufficient distance out of the first plate, for example, if the hole drilled in the first plate is too deep, the first and second plates come into contact with each other before the clamping part has been completely turned into the locked position. This means that the tightening bolt can then not be pulled further toward the clamping part. In prior art fittings, the tightening bolt acts with a high force on the clamping part when the clamping part is further rotated. This force may lead to damage of the clamping part. In accordance with the invention, on the other hand, the intermediate layer is deformed, so that the force exerted by the tightening bolt does not act directly on the clamping part. The deformable intermediate layer has the additional effect that the force is introduced only gradually and not suddenly into the clamping part. However, the fitting according to the present invention also is advantageous if the tightening bolt is projecting too far out of the first furniture part. During assembly, i.e., in the released position, the free end of the head of the tightening bolt makes contact with the deformable intermediate layer and not with the gripping arms of the clamping part. When the clamping part is rotated, the intermediate layer is also deformed and damage of the clamping part is avoided. The fitting according to the invention can be manufactured with low requirements concerning the manufacturing tolerances and with a small quantity of material.

In accordance with a preferred development of the fitting according to the present invention, the intermediate layer is elastically deformable. This means that the fitting remains functional even when the plates are assembled together several times. The fitting can be used repeatedly because after the tightening bolt has been separated from the clamping part, the intermediate layer returns once again almost completely into its original shape.

In accordance with another development of the fitting, the intermediate layer may have recesses, such that projections are formed on the surfaces of the gripping arms. As a result of this feature, free spaces are created adjacent the projections, wherein the material of the projections can be displaced into the free spaces when the head of the tightening bolt deforms the projections in the locked position of the clamping part. In addition, this feature makes it possible that the intermediate layer can be manufactured with less material and, thus, less expensively.

In accordance with an advantageous further development, the projections are constructed in the form of ribs. Such ribs facilitate rotation of the clamping part because the head of the tightening bolt is guided along the ribs.

If the ribs are constructed essentially wedge-shaped, the thickness of the material of the ribs increases against the direction of rotation of the clamping part. This means that the damping effect produced by the ribs increases as the force exerted by the head of the tightening bolt increases.

In accordance with another embodiment, the projections are constructed as burls. This results in a particularly inexpensive manufacture of the intermediate layer.

In accordance with a particularly advantageous feature, the intermediate layer is of plastics material. Plastics material can be manufactured with different hardness, viscosity and elasticity. With a suitable selection of the plastics material, the intermediate layer can be adapted especially well to any type of application. In addition, plastics material can be processed simply and inexpensively.

In accordance with another feature, the intermediate layer and the clamping part are constructed integrally as a single piece. In that case, the clamping part and the intermediate layer can be manufactured in a single work step. It is particularly advantageous if the intermediate layer and the clamping part are made of the same material.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
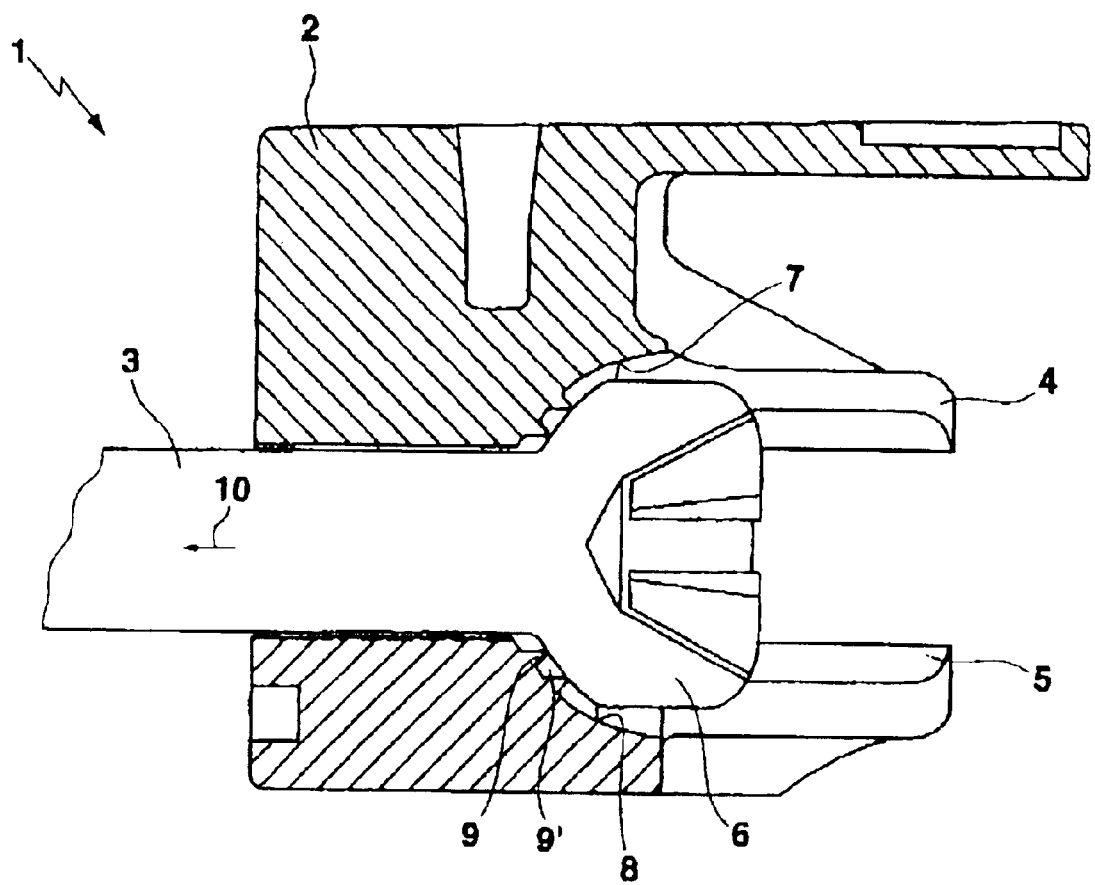
FIG. 1 is a sectional view of a fitting according to the present invention shown in the locked position of the clamping part.

FIG. 1 is a sectional view of a fitting 1 with a clamping part 2 and a tightening bolt 3. The fitting 1 is shown in the locked position. In the locked position, gripping arms 4, 5 of clamping part 2 engage behind the head 6 of the tightening bolt 3. The surfaces 7, 8 of the gripping arms 4, 5 facing the head 6 of the tightening bolt 3 have a deformable intermediate layer 9 in the form of ribs. If the head 6 of the tightening bolt 3 applies a force in the direction of arrow 10 toward the clamping part 2, the intermediate layer 9 in the form of ribs is deformed. Recesses 9' are provided between the individual ribs, wherein the rib material can be displaced into the recesses 9' when the intermediate layer 9 is deformed as a result of the force acting on the head 6.

Figure 2:
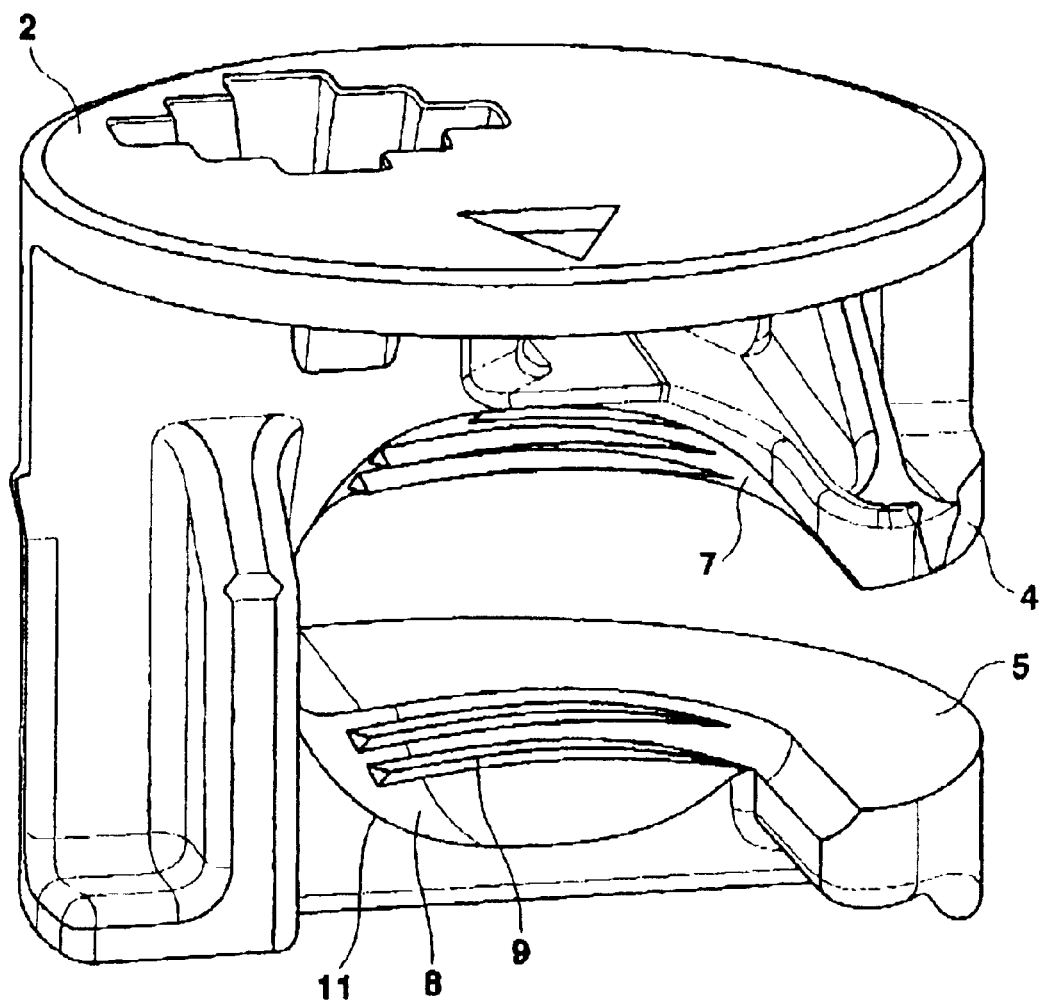
FIG. 2 is a perspective view of the clamping part of FIG. 1.

FIG. 2 of the drawing shows the clamping part 2 of FIG. 1 in a perspective view and on a larger scale. In the released position of the clamping part 2, the head 6 of the tightening bolt 3 is inserted through the opening 11. As a result, the free end of the head 6 of the tightening bolt 3 may already make contact with the intermediate layer 9 constructed in the form of wedge-shaped ribs and may deform the ribs. The wedge-shaped ribs are provided on surfaces 7, 8 of the gripping arms 4, 5 constructed as spherical shell portions. When the clamping part 2 is rotated in a clockwise direction into the locked position, the gripping arms 4, 5 engage behind the head 6 of the tightening bolt 3. This causes the wedge-shaped ribs to come into contact with the rear side of the head 6. The wedge-shaped ribs increase in size in the cross-sectional direction against the direction of rotation. The wedge-shaped ribs compensate for the distance between the head 6 and the surfaces 7, 8 of the gripping arms. In addition, the ribs are deformed when the tightening bolt 3 is tightened by rotating the clamping part 2.

Figure 3:
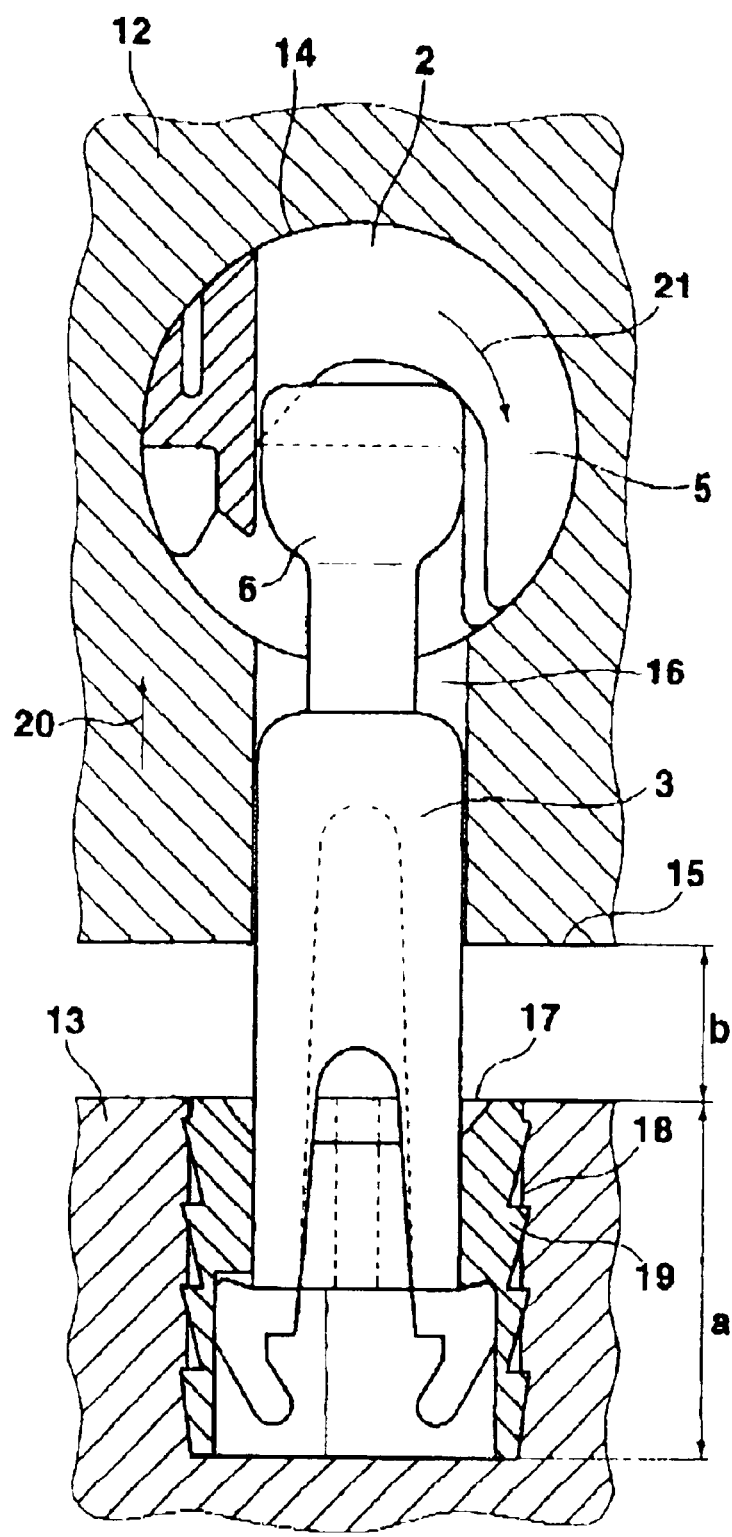
FIG. 3 is a longitudinal sectional view of two plates connected to each other by the fitting.

FIG. 3 of the drawing shows a longitudinal sectional view of the fitting 1 which is composed of a cylindrical clamping part 2 and a corresponding tightening bolt 3. The purpose of the fitting is to connect two furniture plates 12, 13 of wood or plastics material. The first furniture plate 12 has a cylindrical recess 14 for receiving the cylindrical clamping part 2, wherein the recess 14 continues in a bore 16 provided in the end face 15 of this furniture plate 12. The second furniture plate 13 has a bore 18 also provided on the end face 17. Provided in the bore 18 is a sleeve 19 into which the tightening bolt 3 is inserted and anchored in a conventional manner. When the fitting 1 is to be assembled, the tightening bolt 3 together with its head 6 is inserted in the direction of arrow 20 into the bore 16 provided in the first furniture plate 12 until the head of the tightening bolt 3 comes into engagement with the gripping arms 4, 5 of the clamping part 2. When the clamping part 2 is then rotated in the direction of arrow 21, the tightening bolt 3 is pulled into the bore 16 by the distance b until the two furniture plates 12, 13 rest tightly and under tension at the end faces 15, 17 against each other. If the bore 18 is deeper than the distance a and, thus, the tightening bolt 3 is arranged somewhat deeper in the bore 18, the tension between the furniture plates 12, 13 is increased when the clamping part 2 is in the locked position. This tension is absorbed by the deformable intermediate layer 9 which is shown in FIGS. 1 and 2.

While specific embodiments of the invention have been shown and described in detail to illustrate the inventive principles, it will be understood that the invention may be embodied otherwise without departing from such principles.

I claim:

1. A fitting for releasably connecting two plates, the fitting comprising a clamping part rotatable in a direction of rotation between a released position and a locked position, a tightening bolt having a head received by the clamping part, the clamping part having gripping arms configured to engage behind the head of the tightening bolt when the clamping part is in the locked position, wherein surfaces of the gripping arms acting in the locked position of the clamping part against the head of the tightening bolt have projections, wherein the projections are comprised of at least one continuous rib, and wherein the at least one rib increases in size against the direction of rotation and wherein the at least one rib is elastically deformable.

2. The fitting according to claim 1, comprising a plurality of parallel ribs and recesses between the ribs.

3. The fitting according to claim 2, wherein the ribs have an essentially wedge-shaped cross-section.

4. The fitting according to claim 1, wherein the at least one rib is of plastics material.

5. The fitting according to claim 1, wherein the at least one rib and the clamping part are constructed integrally as a single piece.

* * * * *